(12) United States Patent
Shimura

(10) Patent No.: US 10,195,904 B2
(45) Date of Patent: Feb. 5, 2019

(54) PNEUMATIC TIRE

(71) Applicant: BRIDGESTONE CORPORATION, Tokyo (JP)

(72) Inventor: Takashi Shimura, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/307,343

(22) PCT Filed: May 28, 2015

(86) PCT No.: PCT/JP2015/002708
§ 371 (c)(1),
(2) Date: Oct. 27, 2016

(87) PCT Pub. No.: WO2015/182150
PCT Pub. Date: Dec. 3, 2015

(65) Prior Publication Data
US 2017/0043627 A1   Feb. 16, 2017

(30) Foreign Application Priority Data

May 29, 2014  (JP) ................................ 2014-111652

(51) Int. Cl.
*B60C 11/12*   (2006.01)
*B60C 11/04*   (2006.01)
*B60C 11/03*   (2006.01)

(52) U.S. Cl.
CPC .......... *B60C 11/0304* (2013.01); *B60C 11/03* (2013.01); *B60C 11/0302* (2013.01);
(Continued)

(58) Field of Classification Search
CPC . B60C 11/12; B60C 11/1236; B60C 11/1254; B60C 11/0304; B60C 11/03;
(Continued)

(56) References Cited

U.S. PATENT DOCUMENTS 5,766,383 A * 6/1998 Hasegawa ............... B60C 11/00
152/209.18
5,954,107 A * 9/1999 Kuze ................... B60C 11/0302
152/209.26
(Continued)

FOREIGN PATENT DOCUMENTS

CN   102756618 A   10/2012
CN   103097149 A   5/2013
(Continued)

OTHER PUBLICATIONS

Jul. 7, 2015 International Search Report issued in International Patent Application No. PCT/JP2015/002708.

*Primary Examiner* — Jodi C Franklin
(74) *Attorney, Agent, or Firm* — Oliff PLC

(57) ABSTRACT

A pneumatic tire includes on a tread surface at least two circumferential main grooves extending in a tread circumferential direction, and a rib-like land portion partitioned by the two circumferential main grooves extending in the tread circumferential direction, wherein: the rib-like land portion has one or more circumferential sipes extending in the tread circumferential direction; and the rib-like land portion has one or more one-end opening lateral grooves and one or more first one-end opening sipes, the one-end opening lateral grooves extending from one of the two circumferential main grooves in a tread widthwise direction until a position connecting to the circumferential sipes, and ending within the rib-like land portion; the first one-end opening sipes extending from the other of the two circumferential main grooves in a tread widthwise direction, and ending within the rib-like land portion without connecting to the circumferential sipes.

17 Claims, 6 Drawing Sheets

(52) U.S. Cl.
CPC .......... *B60C 11/0306* (2013.01); *B60C 11/12* (2013.01); *B60C 11/1236* (2013.01); *B60C 2011/0341* (2013.01); *B60C 2011/0358* (2013.01); *B60C 2011/0388* (2013.01)

(58) Field of Classification Search
CPC ............. B60C 11/0302; B60C 11/0306; B60C 2011/0341; B60C 2011/0388; B60C 2011/0358
See application file for complete search history.

(56) References Cited

U.S. PATENT DOCUMENTS

| | | | |
|---|---|---|---|
| 8,544,513 B2 | 10/2013 | Miyazaki | |
| 9,061,552 B2* | 6/2015 | Hada | .................. B60C 11/0306 |
| 2003/0226629 A1 | 12/2003 | Kimishima | |
| 2007/0017618 A1* | 1/2007 | Miyasaka | ........... B60C 11/0302 |
| | | | 152/209.18 |
| 2010/0116393 A1* | 5/2010 | Miyazaki | ............ B60C 11/0306 |
| | | | 152/209.18 |
| 2012/0241068 A1* | 9/2012 | Ichihara | ................. B60C 9/2009 |
| | | | 152/535 |
| 2012/0247632 A1* | 10/2012 | Hayashi | .................. B60C 11/12 |
| | | | 152/209.22 |
| 2013/0146190 A1* | 6/2013 | Aoki | ................... B60C 11/0306 |
| | | | 152/209.18 |
| 2013/0220501 A1* | 8/2013 | Hatanaka | ................. B60C 11/04 |
| | | | 152/209.18 |
| 2013/0292021 A1 | 11/2013 | Tanaka | |
| 2014/0209228 A1* | 7/2014 | Kuwayama | ................ B60C 3/04 |
| | | | 152/454 |
| 2014/0290820 A1* | 10/2014 | Hatanaka | ................... B60C 3/04 |
| | | | 152/454 |
| 2014/0299247 A1* | 10/2014 | Hasegawa | ............ B60C 11/0083 |
| | | | 152/454 |

FOREIGN PATENT DOCUMENTS

| | | | | |
|---|---|---|---|---|
| CN | 104364090 A | 2/2015 | | |
| CN | 104890449 A | 9/2015 | | |
| EP | 2292451 A1 * | 3/2011 | ........... | B60C 1/0016 |
| EP | 2 554 402 A1 | 2/2013 | | |
| JP | 2003-326919 A | 11/2003 | | |
| JP | 2008-62806 A | 3/2008 | | |
| JP | 2009-202772 A | 9/2009 | | |
| JP | 2010-111358 A | 5/2010 | | |
| JP | 2010-260413 A | 11/2010 | | |
| JP | 2011-140268 A | 7/2011 | | |
| JP | 2012-228992 A | 11/2012 | | |
| JP | 2013-043580 A | 3/2013 | | |
| JP | 2013-151235 A | 8/2013 | | |
| JP | 2013-233822 A | 11/2013 | | |
| JP | 2014-51178 A | 3/2014 | | |
| JP | 2014-111652 A | 6/2014 | | |
| WO | 2014/038377 A1 | 3/2014 | | |
| WO | 2015/133054 A1 | 9/2015 | | |

* cited by examiner

PNEUMATIC TIRE

TECHNICAL FIELD

This disclosure relates to a pneumatic tire.

BACKGROUND

Conventionally, as a pneumatic tire which is required for high fuel efficiency of electric automobiles, etc., a pneumatic tire having a narrow width and a large diameter is proposed by the Applicant (see, e.g., PTL1).

CITATION LIST

Patent Literature

PTL1 WO2011122170A1

SUMMARY

Technical Problem

In particular, electric automobiles does not generate engine noise, and thus the noise is principally the noise generated by the tires. Therefore, Further improvement in noise performance of tire is desired. Moreover, regarding the aforementioned pneumatic tire, when considering use as all-season tires, on-snow performance, etc. is desired in addition to steering stability, noise performance, etc.

Therefore, this disclosure is to provide a pneumatic tire capable of achieving steering stability, noise performance, and on-snow performance.

Solution to Problem

The subject of this disclosure is as follows.

The pneumatic tire of this disclosure includes on a tread surface at least two circumferential main grooves extending in a tread circumferential direction, and a rib-like land portion partitioned by the two circumferential main grooves extending in the tread circumferential direction, in which: the rib-like land portion has one or more circumferential sipes extending in the tread circumferential direction; and the rib-like land portion has one or more one-end opening lateral grooves and one or more first one-end opening sipes, the one-end opening lateral grooves extending from one of the two circumferential main grooves in a tread widthwise direction until a position connecting to the circumferential sipes, and ending within the rib-like land portion; the first one-end opening sipes extending from the other of the two circumferential main grooves in a tread widthwise direction, and ending within the rib-like land portion without connecting to the circumferential sipes.

Here, the "rib-like land portion" refers to a land portion having a part continuous in the tread circumferential direction, without any grooves or sipes extending in the tread widthwise direction between two circumferential main grooves partitioning the rib-like land portion.

Moreover, the "circumferential main groove" refers to one having a width opening to the tread surface of 2 mm or more at an unloaded condition, when the pneumatic tire is mounted to an applicable rim and is applied with a prescribed internal pressure; on the other hand, the "sipe" is a thin cut from the surface to the inside of the land portion, which is closable when contacting the ground, and refers to one having a width opening to the tread surface of less than 2 mm at an unloaded condition, when the pneumatic tire is mounted to an applicable rim and is applied with a prescribed internal pressure.

On the other hand, the "lateral groove" refers to one having a width opening to the tread surface of 2 mm or more at an unloaded condition, when the pneumatic tire is mounted to an applicable rim and is applied with a prescribed internal pressure.

Further, the "one-end opening lateral groove" and the "one-end opening sipe" refer to those opening to the circumferential main grooves on one side, and not opening to the circumferential main grooves or the lateral grooves on the other side, but are also inclusive of those opening to the circumferential sipes on the other side.

Here, the "applicable rim" is a valid industrial standard for the region in which the tire is produced or used, and refers to a rim as set forth in JATMA (the Japan Automobile Tyre Manufacturers Association) YEAR BOOK in Japan, ETRTO (European Tyre and Rim Technical Organisation) STANDARD MANUAL in Europe, TRA (THE TIRE and RIM ASSOCIATION INC.) YEAR BOOK in the U.S., etc. Moreover, the "prescribed internal pressure" refers to an internal pressure corresponding to a tire maximum load carrying capacity (maximum air pressure) of a standard of the aforementioned JATMA, etc. in a tire of an applicable size.

Advantageous Effect

According to this disclosure, it is possible to provide a pneumatic tire capable of achieving steering stability, noise performance and on-snow performance.

DETAILED DESCRIPTION

Hereinafter, an embodiment of this disclosure will be described with reference to the drawings.

Figure 1:
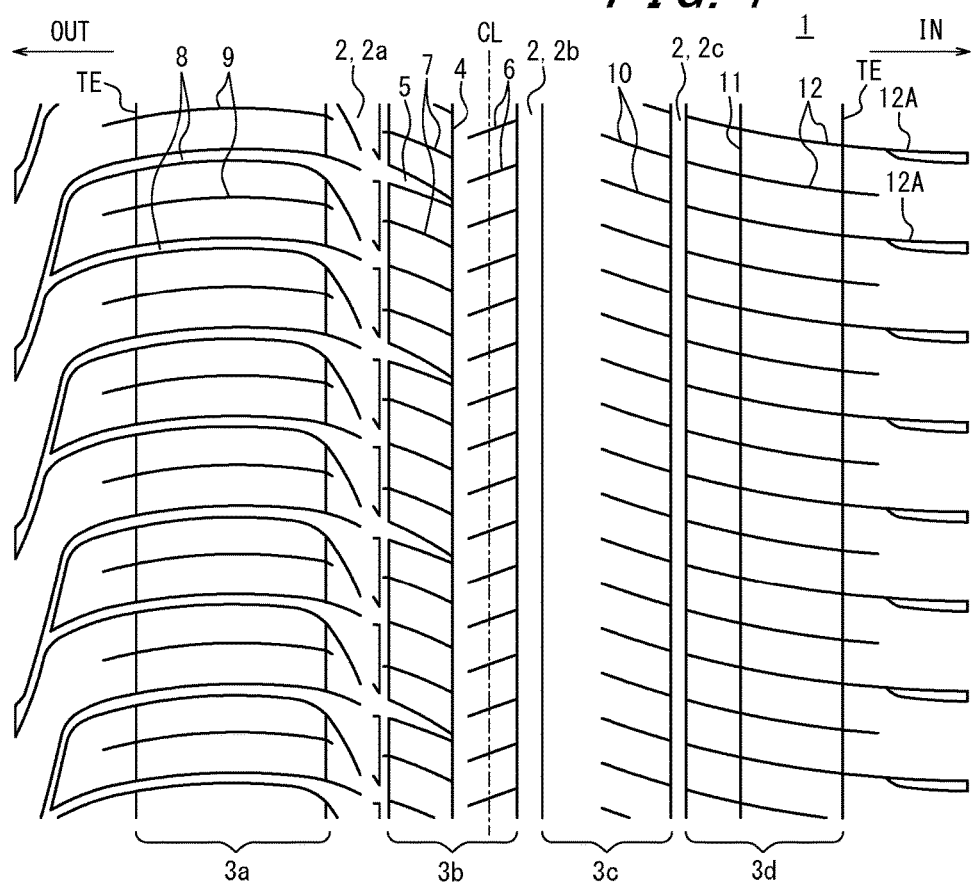
FIG. 1 illustrates a developed view showing a tread pattern of a pneumatic tire according to one embodiment of this disclosure.

FIG. 1 illustrates a developed view showing a tread pattern of a pneumatic tire according to one embodiment of this disclosure (hereinafter referred to as "tire"), and shows a developed view of the tread surface and the buttress portion of the tire at an unloaded condition, when the pneumatic tire is mounted to an applicable rim and is applied with a prescribed internal pressure. Here, the inner structure, etc. of the tire is similar as conventional ones, and thus the description is omitted. Moreover, in the tire of the present embodiment, when an outer diameter of the tire is OD, and a sectional width of the tire is SW, when an internal pressure is set to 250 kPa or more, in the case where the sectional width SW of the tire is less than 165 (mm), a ratio SW/OD of the sectional width SW to the outer diameter OD of the tire is 0.26 or less, and in the case where the sectional width SW of the tire is 165 (mm) or more, the sectional width SW and the outer diameter OD of the tire satisfy a relation expression OD≥2.135×SW+282.3 (hereinafter referred to as "satisfying relation expression (1)).

As illustrated in FIG. 1, the tire of the present embodiment has on a tread surface 1 at least two (three in the illustrated example) circumferential main grooves 2 continuously extending in the tread circumferential direction.

In the illustrated example, this tire has on the tread surface 1 three circumferential main grooves 2a, 2b and 2c, the circumferential main groove 2a being arranged on a tread half portion centering on a tire equatorial plain CL, and the circumferential main grooves 2b and 2c being arranged on the other tread half portion centering on the tire equatorial plain CL. In the illustrated example, four land portions 3a, 3b, 3c and 3d are partitioned by these circumferential main grooves 2a, 2b and 2c and a tread edge TE.

Here, the "tread edge TE" refers to an outermost position in the tread widthwise direction of the contact patch when the tire is mounted to an applicable rim, applied with a prescribed internal pressure, and carries a load corresponding to the aforementioned maximum load carrying capacity (maximum load).

Here, the groove width of the circumferential main groove 2a can be set to, e.g., 7 to 10 mm; the groove width of the circumferential main groove 2b can be set to, e.g., 5 to 8 mm; and the groove width of the circumferential main groove 2c can be set to, e.g., 2 to 5 mm.

Moreover, the groove depth of the circumferential main groove 2a can be set to, e.g., 6 to 8 mm; the groove depth of the circumferential main groove 2b can be set to, e.g., 6 to 8 mm; and the groove depth of the circumferential main groove 2c can be set to, e.g., 6 to 8 mm.

Here, the "groove width" and the "groove depth" respectively refer to the opening width to the tread surface and the average depth of the groove at an unloaded condition, when the pneumatic tire is mounted to an applicable rim and is applied with a prescribed internal pressure, and the same goes with the other grooves and sipes hereinafter.

Figure 2:
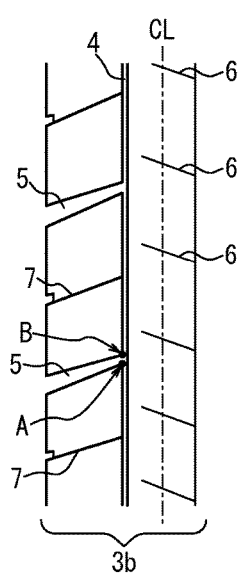
FIG. 2 illustrates a partial developed view showing important parts of the tread pattern as illustrated in FIG. 1.

Here, FIG. 2 illustrates a partial developed view showing important parts of the tread pattern as illustrated in FIG. 1. As illustrated in FIGS. 1, 2, the land portion 3b partitioned by the circumferential main groove 2a and the circumferential main groove 2b is a rib-like land portion without grooves extending in the tread widthwise direction between the circumferential main grooves 2a and 2b. Further, in the illustrated example, this land portion 3b has one circumferential sipe 4 continuously extending in the tread circumferential direction. The sipe width of the circumferential sipe 4 can be set to, e.g., 0.5 to 1.5 mm, and the sipe depth of the circumferential sipe 4 can be set to, e.g., 3 to 6 mm.

As illustrated in FIGS. 1, 2, the rib-like land portion 3b has a plurality (4 in the scope illustrated in FIG. 1) of one-end opening lateral grooves 5, which extend from the circumferential main groove 2a toward the tread widthwise inner side until the circumferential sipe 4, and end within the rib-like land portion 3b. Further, the rib-like land portion 3b has a plurality of (16 in the scope illustrated in FIG. 1) first one-end opening sipes 6, which extend from the circumferential main groove 2b in the tread widthwise direction, and end within the rib-like land portion 3b without connecting to the circumferential sipe 4.

Here, the groove width (maximum width) of the one-end opening lateral grooves 5 can be set to, e.g., 3 to 5 mm, and the groove depth can be set to 6 to 8 mm.

Moreover, the sipe width of the first one-end opening sipes 6 can be set to, e.g., 0.5 to 1.5 mm, and the sipe depth can be set to 2 to 4 mm.

Regarding the aforementioned tire, when the tire is mounted to a vehicle in a manner such that the one-end opening lateral grooves 5 are positioned on the outer half portion when mounted to the vehicle, the effect is described in the following.

First, in the tire of the present embodiment, the vicinity of the circumferential main grooves 2a has reduced rigidity, and thus is greatly affected by the force from the road surface during cornering. Specifically, due to the compression stress on the vehicle-installed outside and the tensile stress on the vehicle-installed inside, the tread rubber is deformed and the belt is deformed, leading to a risk of buckling phenomenon such that the contact patch floats up. Regarding this, in the tire of the present embodiment, the aforementioned one-end opening lateral grooves 5 are disposed, and thus on the vehicle-installed outside, a structure is formed such that the one-end opening lateral grooves 5 are closed due to compression stress. Therefore, deformation of the tread rubber and the belt can be suppressed. Further, since the one-end opening lateral grooves 5 end within the rib-like land portion 3b, the rigidity against the tensile stress on the vehicle-installed inside is improved, and thereby the deformation of the tread and the belt is suppressed. Therefore, according to the present embodiment, first, it is possible to suppress generation of buckling.

Moreover, the tire of the present embodiment has a circumferential sipe 4, and thus can ensure the edge component against the side force direction, and can improve the on-snow performance during cornering.

Further, by connecting the circumferential sipe 4 and the one-end opening lateral grooves 5, as illustrated in FIG. 2, corner portions A, B of the block are formed within the land portion 3b, and thus the edge effect against the straight running direction and the side force direction is increased, and it is possible to improve the on-snow performance during straight running (on-snow traction performance and on-snow braking performance) and the on-snow performance during cornering (on-snow cornering performance).

Furthermore, since the aforementioned first one-opening sipes 6 are disposed, it is possible to further increase the edge component against the straight running direction, and to improve the on-snow performance during straight running. Here, the first one-end opening sipes 6 do not connect to the circumferential sipe 4, and thus it is possible to ensure the steering stability the noise performance without excessively deteriorating the rigidity of the rib-like land portion 3b.

Therefore, according to the tire of the present embodiment, it is possible to achieve the steering stability, the noise performance and the on-snow performance.

Moreover, as illustrated in FIGS. 1, 2, a plurality of the one-end opening lateral grooves 5 are formed on the rib-like land portion 3b in a manner spaced from each other in the tread circumferential direction, while the rib-like land portion 3b has between the one-end opening lateral grooves 5 one or more (13 in the scope illustrated in FIG. 1) second one-end opening sipes 7 which extend from the circumferential main groove 2a toward the tread widthwise inner side until a position connecting to the circumferential sipe 4, and end within the rib-like land portion 3b. In the illustrated example, there are three second one-end opening sipes 7 between each two adjacent one-end opening lateral grooves 5 in the tread circumferential direction.

Here, the sipe width of the second one-end opening sipes 7 can be set to, e.g., 0.5 to 1.5 mm, and the sipe depth can be set to 6 to 8 mm.

In this way, the tire of this disclosure preferable has between the one-end opening lateral grooves 5 one or more second one-end opening sipes 7, which extend from one circumferential main groove 2a in the tread widthwise direction to a position connecting to the circumferential sipe 4, and end within the rib-like land portion 3b.

In this way, it is possible to further ensure the edge component against the straight running direction, and to further improve the on-snow performance during straight running. For example, if forming all one-end opening lateral grooves 5 instead of the second one-end opening sipes 7, there is a risk of deterioration in the rigidity of the rib-like land portion 3b and deterioration in the steering stability and the noise performance, while on the other hand, according to the present embodiment, by disposing both one-end opening lateral grooves 5 and second one-end opening sipes 7, it is possible to ensure the steering stability and the noise performance, and simultaneously improve the on-snow performance during straight running. Further, the aforementioned suppression of buckling can be obtained even not so many one-end opening lateral grooves 5 are disposed.

More specifically, the pitch spacing in the tread circumferential direction of two one-end opening lateral grooves 5 adjacent to each other in the tread circumferential direction is preferably set to 35 to 70 mm. This is because that, by setting to 35 mm or more, it is possible to ensure the rigidity of the land portion, and ensure the steering stability and the noise performance, and on the other hand, by setting to 70 mm or less, it is possible to obtain the aforementioned buckling suppressing effect more effectively.

Moreover, the pitch spacing in the tread circumferential direction of the first one-end opening sipes 6 is preferably set to 10 to 15 mm. This is because that, by setting to 10 mm or more, it is possible to ensure the rigidity of the land portion, and ensure the steering stability and the noise performance, and on the other hand, by setting to 15 mm or less, it is possible to further obtain the aforementioned effect of improving the on-snow performance during straight running.

Moreover, the pitch spacing in the tread circumferential direction of the second one-end opening sipes 7 is preferably set to 10 to 15 mm. This is because that, by setting to 10 mm or more, it is possible to ensure the rigidity of the land portion, and ensure the steering stability and the noise performance, and on the other hand, by setting to 15 mm or less, it is possible to further obtain the aforementioned effect of improving the on-snow performance during straight running.

Moreover, as illustrated in FIGS. 1, 2, the first one-end opening sipes 6 and the second one-end opening sipes 7 preferably have a phase difference arranged in the tread circumferential direction. This is because that it is possible to suppress generation of pattern noise, and to uniform the rigidity balance of the land portion.

Then, in this disclosure, as illustrated in FIGS. 1, 2, the first one-end opening sipes 6 preferably laterally cross the tire equatorial plain CL (extend beyond the tire equatorial plain CL).

This is because that ordinarily in a pneumatic tire, the contact length becomes longest in the tire equatorial plain CL, and thus by arranging first one-end opening sipes 6 at this position, it is possible to effectively improve the on-snow performance during straight running. Moreover, in this case, the one-end opening lateral grooves 5 are located on the vehicle-installed outside, and thus it becomes easier to obtain the buckling suppression effect as mentioned above.

Here, when the angle of a straight line connecting both end portions of the one-end opening lateral grooves 5 against the tread widthwise direction is defined as the inclination angle of the one-end opening lateral grooves 5 against the tread widthwise direction, the inclination angle of the one-end opening lateral grooves 5 is preferably set to 30° or less. This is because that by setting to 30° or less, it is possible to obtain the aforementioned buckling suppression effect more effectively.

Moreover, when the angle of a straight line connecting both end portions of the first one-end opening sipes 6 against the tread widthwise direction is defined as the inclination angle of the first one-end opening sipes 6 against the tread widthwise direction, the inclination angle of the first one-end opening sipes 6 is preferably set to 35° or less. This is because that by setting to 35° or less, it is possible to effectively obtain the aforementioned on-snow performance during straight running.

Moreover, when the angle of a straight line connecting both end portions of the second one-end opening sipes 7 against the tread widthwise direction is defined as the inclination angle of the second one-end opening sipes 7 against the tread widthwise direction, the inclination angle of the second one-end opening sipes 7 is preferably set to 40° or less. This is because that by setting to 40° or less, it is possible to effectively obtain the aforementioned on-snow performance during straight running.

Next, as illustrated in FIG. 1, in the tire of this embodiment, the land portion 3a has a plurality (8 in the illustrated scope) of side lateral grooves 8 extending from the circumferential main groove 2a to the tread widthwise outer side, and in the illustrated example, the side lateral grooves 8 extend on the tread widthwise outer side and connect to the tread edge TE. Moreover, between two side lateral grooves 8 adjacent in the tread circumferential direction, in the illustrated example, there is one first side sipe 9 extending in the tread widthwise direction and connecting to the tread edge TE and the circumferential main groove 2a.

It is possible to ensure the edge component against the straight running direction and the on-snow performance during straight running with these side lateral grooves 8 and the first side sipes 9, and by not using all side lateral grooves 8 but a combination of side lateral grooves 8 and first side sipes 9, it is possible to prevent the rigidity of the land portion 3a from being excessively deteriorated, and to ensure the steering stability and the noise performance.

Here, the groove width of the lateral groove 8 can be, e.g., 2 to 4 mm, and the groove depth can be 6 to 8 mm. Moreover, the pitch spacing in the tread circumferential direction of two side lateral grooves 8 adjacent in the tread circumferential direction can be set to 17 to 30 mm. Further, when an angle against the tread widthwise direction of a straight line connecting the tread widthwise inner edge portion (connecting to the circumferential main groove 2a) of the lateral grooves 8 and a part 10 mm inner than the edge portion along the periphery of the side lateral grooves 8 is defined as the inclination angle against the tread widthwise direction of the side lateral grooves 8, in this example, said inclination angle is less than 10°.

Here, the sipe width of the first side sipes 9 can be set to, e.g., 0.5 to 1.5 mm, and the sipe depth can be set to, e.g., 6 to 8 mm. Moreover, when the angle of the straight lines connecting both end portions of the first side sipes 9 against the tread widthwise direction is defined as the inclination angle of the first side sipes 9 against the tread widthwise direction, the inclination angle of the first side sipes 9 is preferably 40° or less. By setting to 40° or less, it is possible to effectively obtain the aforementioned on-snow performance during straight running.

Next, as illustrated in FIG. 1, the tire of this embodiment has on the land portion 3c a plurality of (17 in the illustrated scope) intermediate sipes 10, which extend from the circumferential main groove 2c toward the tread widthwise inner side, and end within the land portion 3c. As illustrated in FIG. 1, in order to render the intermediate sipes 10 end within the land portion 3c, a part of the land portion 3c is formed as a rib-like land portion continuous in the tread circumferential direction.

When the tire is mounted to a vehicle in a manner such that the one-end opening lateral grooves 5 are located in the vehicle-installed outside half portion, the land portion 3c becomes the vehicle-installed inside, while a rib-like land portion is formed within the land portion 3c on the vehicle-installed inside, which greatly affects the riding comfort, and thus it is possible to effectively improve the riding comfort. Moreover, due to the intermediate sipes 10, it is possible to ensure the edge component against the straight running, and to further improve the on-snow performance during straight running Here, the sipe width of the intermediate sipes 10 can be set to, e.g., 0.5 to 1.5 mm, and the sipe depth can be set to, e.g., 6 to 8 mm. Moreover, the pitch spacing in the tread circumferential direction of the intermediate sipes 10 is preferably set to 10 to 15 mm. This is because that by setting to 10 mm or more, it is possible to ensure the rigidity of the land portion, and ensure the steering stability and the noise performance; while on the other hand, by setting to 15 mm or less, it is possible to obtain the aforementioned improvement effect of on-snow performance during straight running more effectively.

Further, when the angle of a straight line connecting both end portions of the intermediate sipes 10 against the tread widthwise direction is defined as the inclination angle of the intermediate sipes 10 against the tread widthwise direction, the inclination angle of the intermediate sipes 10 is 25° or less in the example illustrated in FIG. 1.

Furthermore, the extending length in the tread widthwise direction of the intermediate sipes 10 is preferably set to 40 to 80% of the tread widthwise width of the land portion 3c. This is because that by setting to 40% or more, it is possible to sufficiently ensure the edge component and to further improve the on-snow performance during straight running, and on the other hand, by setting to 80% or less, it is possible to form a rib-like land portion with a sufficient width, and to improve the riding comfort.

As illustrated in FIG. 1, the tire of the present embodiment has on the land portion 3d one inner circumferential sipe 11 continuously extending in the tread circumferential direction. Thereby, it is possible to ensure the edge component against the side force direction, and improve the on-snow performance during cornering.

Here, the sipe width of the inner circumferential sipe 11 can be set to, e.g., 0.5 to 1.5 mm, and the sipe depth can be set to, e.g., 6 to 8 mm.

As illustrated in FIG. 1, the land portion 3d has a plurality of second side sipes 12 (16 in the illustrated scope) extending from the circumferential main groove 2c to the tread widthwise outer side. In the example as illustrated in FIG. 1, the second side sipes 12 directly connect to the tread edge TE extending from the circumferential main groove 2c to the tread widthwise outer side. Moreover, the second side sipes 12 are arranged in a manner such that those connecting to lug grooves 12A positioned in a region on a side outer in the tread widthwise direction than the tread edge TE and those not connecting to the lug groove 12A are arranged alternatively in the tread circumferential direction.

Due to these second side sipes 12, it is possible to ensure the edge component against the straight running, and to further improve the on-snow performance during straight running. Here, the sipe width of the second side sipes 12 can be set to, e.g., 0.5 to 1.5 mm, and the sipe depth can be set to, e.g., 6 to 8 mm. Moreover, the pitch spacing in the tread circumferential direction of the second side sipes 12 is preferably set to 10 to 15 mm. This is because that by setting to 10 mm or more, it is possible to ensure the rigidity of the land portion, and ensure the steering stability and the noise performance; while on the other hand, by setting to 15 mm or less, it is possible to obtain the aforementioned improvement effect of on-snow performance during straight running more effectively. Further, when the angle of a straight line connecting both end portions of the second side sipes 12 against the tread widthwise direction is defined as the inclination angle of the second side sipes 12 against the tread widthwise direction, the inclination angle of the sipes 12 is preferably set to 30° or less in order to further improve the aforementioned on-snow performances during straight running.

As illustrated in FIG. 1, the tire having a small number of lateral grooves and a large number of sipes is preferable in a tire having a narrow width and a large diameter, in which, particularly when an internal pressure is set to 250 kPa or more, in the case where the sectional width SW of the tire is less than 165 (mm), a ratio SW/OD of the sectional width SW to the outer diameter OD of the tire is 0.26 or less, and in the case where the sectional width SW of the tire is 165 (mm) or more, the sectional width SW and the outer diameter OD of the tire satisfy a relation expression OD≥2.135×SW+282.3; and is more preferable in a tire having a ratio OD/SW of 3.6 or more. The tire of this disclosure is preferably used at an internal pressure of 250 to 350 kPa, more preferably at a high internal pressure of 280 kPa or more, further more preferably at a high internal pressure of 300 kPa or more. This is because that under the condition of a narrow width at a high internal pressure, it is possible to sufficiently ensure the wet performance, and thus it is possible reduce the number of the lateral grooves, or instead increase the number of sipes. Therefore, in synergy with a large bite force of the sipe to the road surface due to the use condition of high internal pressure, the edge effect can be exhibited effectively. Moreover, the aforementioned tire is preferably used as a radial tire for passenger vehicle, and to be applicable for use on public road, preferably has an air volume of 15000 $cm^3$ or more.

Figure 3:
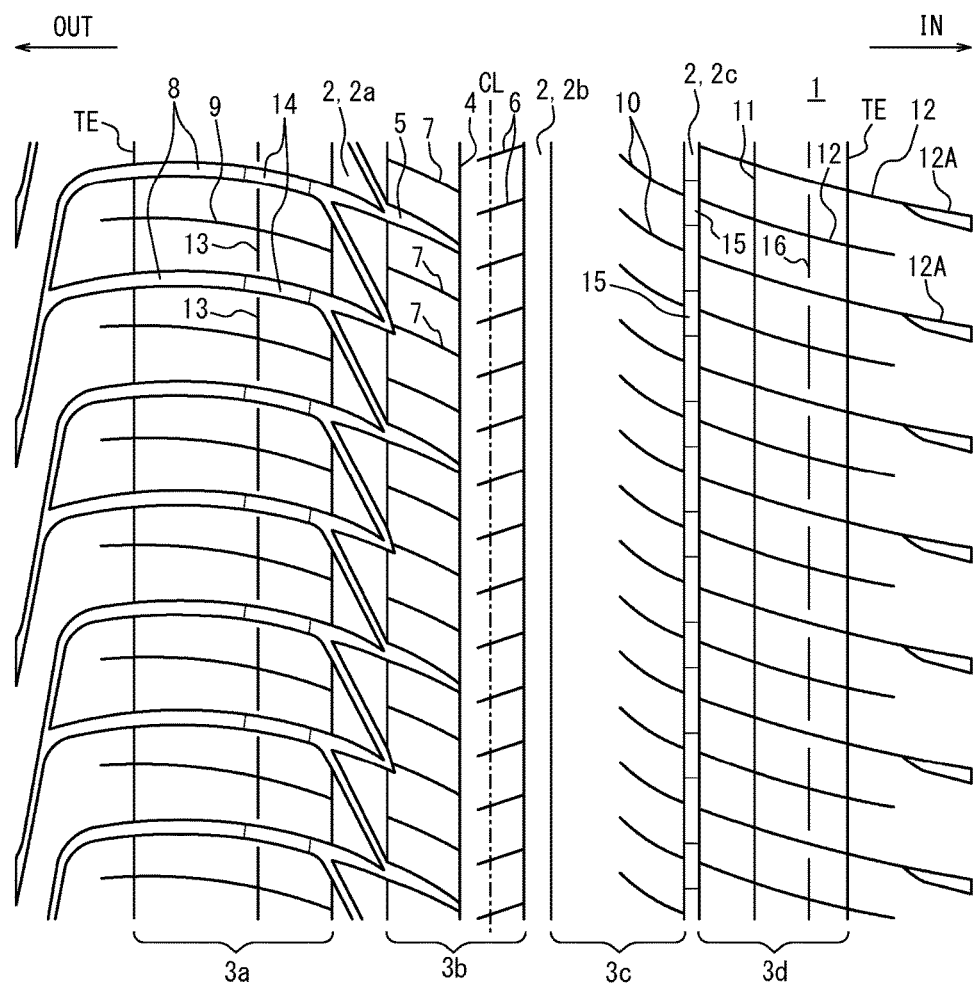
FIG. 3 illustrates a developed view showing a tread pattern of a pneumatic tire according to another embodiment of this disclosure.

Next, FIG. 3 illustrates a developed view showing a tread pattern of a pneumatic tire according to another embodiment of this disclosure (hereinafter referred to as "tire"), and shows a developed view of the tread surface and the buttress portion of the tire at an unloaded condition, when the pneumatic tire is mounted to an applicable rim and is applied with a prescribed internal pressure. In the tire of the present embodiment, when an internal pressure is set to 250 kPa or more, in the case where the sectional width SW of the tire is less than 165 (mm), a ratio SW/OD of the sectional width SW to the outer diameter OD of the tire is 0.26 or less, and in the case where the sectional width SW of the tire is 165 (mm) or more, the sectional width SW and the outer diameter OD of the tire satisfy a relation expression OD≥2.135×SW+282.3.

Figure 4:
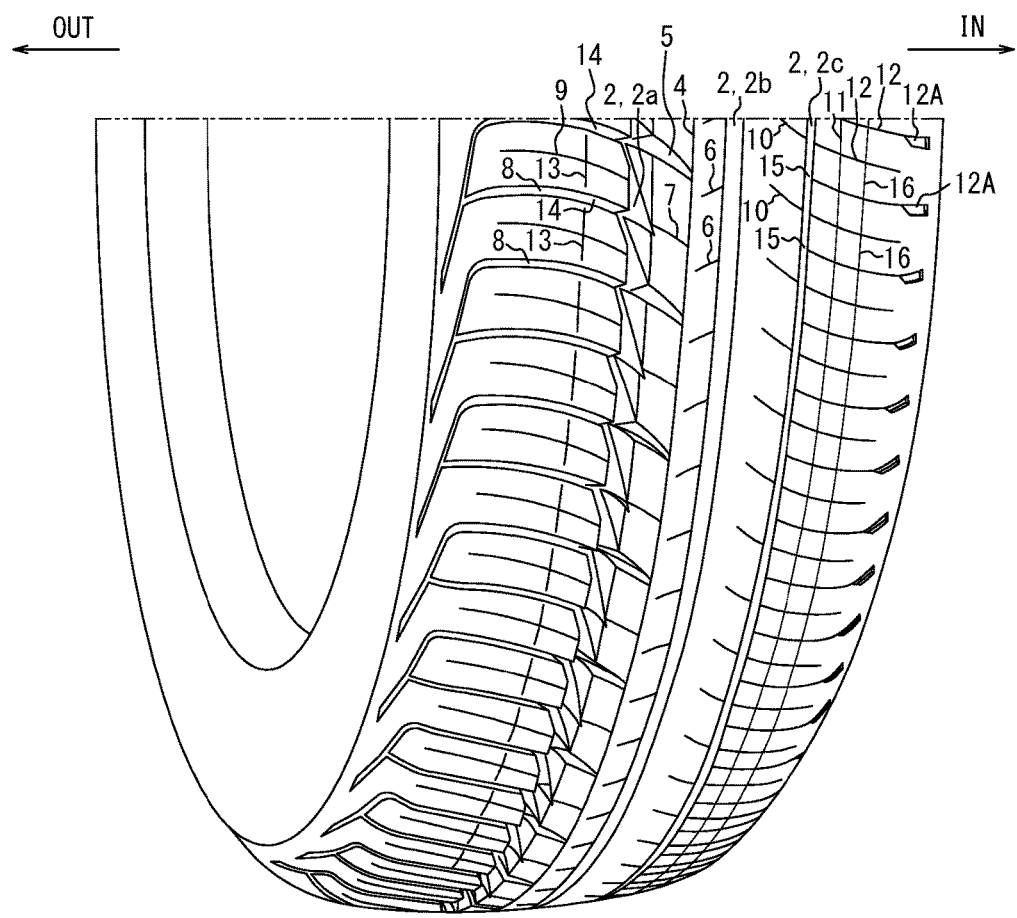
FIG. 4 illustrates a partial perspective view of a pneumatic tire according to another embodiment of this disclosure.

Further, FIG. 4 is a partial perspective view of a tire having a tread pattern the same as the tire according to FIG. 3, except the numbers of first one-end opening sipes 6, second one-end opening sipes 7 and intermediate sipes 10.

The tire as illustrated in FIG. 3 is different from the tire as illustrated in FIG. 1 in the following points. Here, regarding the embodiment as illustrated in FIG. 3, the following description of the effect is on the effect in the case where the tire is mounted to a vehicle in a manner such that the one-end opening lateral grooves 5 are positioned on the outer half portion when mounted to the vehicle.

First, regarding the land portion 3a, as illustrated in FIG. 3, the tire of this embodiment has one side circumferential sipes 13 extending in the tread circumferential direction between each two side lateral grooves 8 adjacent in the tread circumferential direction. As illustrated in FIG. 3, both ends of the side circumferential sipes 13 end within the land portion 3a without connecting to the side lateral groove 8.

Due to these side circumferential sipes 13, it is possible to ensure the edge component against the side force direction especially in the vehicle-installed outside, which has a great effect on the steering stability, and it is possible to further improve the on-snow performance during cornering.

In the embodiment as illustrated in FIG. 1, the block partitioned by the two side lateral grooves 8 adjacent in the tread circumferential direction, the circumferential main groove 2a and the tread edge has a long rectangular shape of which the widthwise length is longer than the circumferential length. However, in the embodiment as illustrated in FIG. 3, since the pitch spacing in the tread circumferential direction of the side lateral grooves 8 is set to 17 to 30 mm, the width of the block in the tread circumferential direction is large, and this block becomes a shape separated into two blocks by the side circumferential sipes 13 (strictly, the separation is not complete because the side circumferential sipes 13 do not connect to the side lateral grooves 8). Therefore, the shape of the block is close to square, and thereby, it is possible to particularly suppress torsional deformation of the block and to improve the wear resistance when a longitudinal force is applied to the block.

Further, the side circumferential sipes 13 cross the first side sipes 9, but do not connect to the side lateral grooves 8. Therefore, it is possible to ensure the steering stability and the noise performance without excessively deteriorating the rigidity of the block. Therefore, the side circumferential sipes 13 are preferably spaced from the side main grooves 8 by 1.5 mm or more.

Further, the sipe width of the side circumferential sipes 13 can be set to, e.g., 0.5 to 1.5 mm, and the sipe depth can be set to, e.g., 6 to 8 mm.

Figure 5:
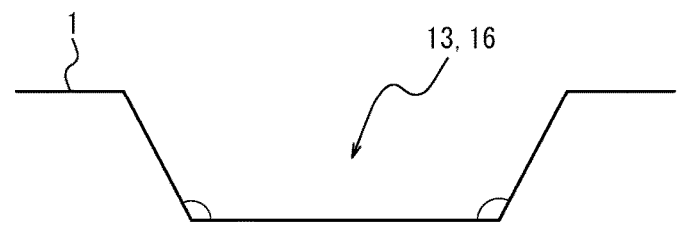
FIG. 5 illustrates a tread circumferential cross-sectional view of the side circumferential sipes and the outer circumferential sipe.

Here, FIG. 5 illustrates a tread circumferential cross-sectional view of the side circumferential sipes 13. As illustrated in FIG. 5, both end portions of the side circumferential sipes 13 are of a shape such that a side wall is inclined, in which the circumferential length becomes shorter from the tread surface 1 side toward the sipe depth direction. Thereby, on the tread surface 1 side, it is possible to ensure the sipe length in order to ensure the edge component, and on the other hand, it is possible to set the corner portions on the sipe bottom to an obtuse angle, to thereby improve the rigidity, prevent these corner portions from becoming the abrasion core, and improve the wear resistance.

Further, in the tire of the embodiment as illustrated in FIG. 1, the inclination angle against the tread widthwise direction of the side lateral grooves 8 is less than 10°, while in the tire of the embodiment as illustrated in FIG. 3, the inclination angle against the tread widthwise direction of the side lateral grooves 8 is 10° or more. In this way, it is possible to ensure the edge component in not only the travelling direction, but in both the travelling direction and the side force direction. Therefore, it is possible to comprehensively improve the on-snow performance during straight running and cornering.

In the tire of the embodiment as illustrated in FIG. 3, bottom up portions 14 are disposed in the side main grooves 8. In this way, it is possible to improve the rigidity of the block, to improve the steering stability and the wear resistance, and to further reduce the steering sound. Here, the height of the bottom up portions 14 can be set to, e.g., 30 to 60% of the groove depth of the side lateral grooves 8. Moreover, the bottom up portions 14 are preferably disposed in the vicinity of the circumferential main groove 2a, where the rigidity is likely to be deteriorated among the groove bottoms of the side lateral grooves 8.

Further, the tire of the embodiment as illustrated in FIG. 3 is different from the tire of the embodiment as illustrated in FIG. 1 as well in the point that the inclination angle of the intermediate sipes 10 formed within the land portion 3c against the tread widthwise direction is 15° or more. This is because that it is possible to ensure not only the travelling direction, but also the edge component against both the travelling direction and the side force direction, and thus it is possible to comprehensively improve the on-snow performance during straight running and during cornering.

Further, the tire of the embodiment as illustrated in FIG. 3 is different from the tire of the embodiment as illustrated in FIG. 1 as well in the point that one or more bottom up portions 15 are disposed in the circumferential main groove 2c. In this way, it is possible to improve the rigidity of the block, to improve the steering stability and the wear resistance, and to further reduce the steering sound. Here, the height of the bottom up portions 15 can be set to, e.g., 30 to 60% of the groove depth of the circumferential main groove 2c. Moreover, the bottom up portions 15 are preferably disposed at the positions connecting to the second side sipes 12, from the viewpoint of reinforcing the portions of which the rigidity is deteriorated.

Further, the embodiment as illustrated in FIG. 3 is a tire such that: when the internal pressure is set to 250 kPa or more, in the case where the sectional width SW of the tire is less than 165 (mm), the ratio SW/OD of the sectional width SW to the outer diameter OD of the tire is 0.26 or less, and in the case where the sectional width SW of the tire is 165 (mm) or more, the sectional width SW and the outer diameter OD of the tire satisfy the relation expression: OD≥2.135×SW+282.3. Therefore, even if the bottom up portions 14, 15 are disposed, it is possible to sufficiently ensure the wet performance.

Further, as illustrated in FIG. 3, the tire of the present embodiment has, on a tread widthwise side outer than the inner circumferential sipe 11 in the land portion 3d, one outer circumferential sipe 16 extending in the tread circumferential direction, between each two side circumferential sipes 12 connecting a lug groove 12A in a region on a tread widthwise side outer than the tread edge TE among the side circumferential sipes 12. Thereby, it is possible to ensure the edge component against the side force direction, and it is possible to further improve the on-snow performance during cornering. Further, the outer circumferential sipe 16 crosses the second side sipes 12 which do not connect to the lug grooves 12A in the region of the tread widthwise outer side among the second side sipes 12, but does not connect to the tread the second side sipes 12 connecting to the lug groove 12A in the region of the tread widthwise outer side. Therefore, it is possible to ensure the steering stability and the noise performance, without excessively deteriorating the rigidity of the block. Therefore, the outer circumferential sipe 16 is preferably separated by 1.5 mm or more from the second side sipes 12 connecting the lug grooves 12A. The sipe width of the outer circumferential sipe 16 can be set to, e.g., 0.5 to 1.5 mm, and the sipe depth can be set to, e.g., 6 to 8 mm. Moreover, as illustrated in FIG. 5, both end portions of the outer circumferential sipe 16 are of a shape such that a side wall is inclined, in which the circumferential length becomes shorter from the tread surface 1 side toward the sipe depth direction. Thereby, on the tread surface 1 side, it is possible to ensure the sipe length in order to ensure the edge component, and on the other hand, it is possible to set the corner portions on the sipe bottom to an obtuse angle, to thereby improve the rigidity, prevent these corner portions from becoming the abrasion core, and improve the wear resistance.

Here, the groove depth h1 of the circumferential main grooves 2c, the sipe depth h2 of the inner circumferential sipe 11 and the sipe depth h3 of the outer circumferential sipe 16 preferably satisfy the condition h1>h3>h2. First, the circumferential main groove 2c preferably has a depth at some degree from the viewpoint of drainage performance. Based on this assumption, if the sipe depth of the inner circumferential sipe 11 is too large, there is a risk that the rigidity of the land portion between the circumferential main groove 2c and the inner circumferential sipe 11 is deteriorated excessively, which causes deterioration in steering stability. Therefore, the sipe depth of the inner circumferential sipe 11 is preferably set smaller than the groove depth of the circumferential main groove 2c in order to ensure the steering stability. On the other hand, if the sipe depth of the outer circumferential sipe 16 is reduced together, there is a risk that the circumferential sipe disappears early during wearing, and the on-snow performance during wearing is deteriorated rapidly. Therefore, the sipe depth h3 of the outer circumferential sipe 16 is preferably set larger than the sipe depth h2 of the inner circumferential sipe 11. Here, since the sipe depth h2 of the inner circumferential sipe 11 is set to a small value, although the sipe depth h3 of the outer circumferential sipe 16 is set larger than h2, the rigidity of the land portion between the circumferential sipes 11, 16 is not excessively deteriorated. On the other hand, comparing with the circumferential main groove 2c, the circumferential sipes 11, 16 contribute less to the drainage performance, and from the viewpoint of not excessively deteriorating the rigidity of the land portion, both the sipe depths h2, h3 of the circumferential sipes 11, 16 are preferably set smaller than the groove depth h1 of the circumferential main groove 2c.

As mentioned above, it is preferable that the inner circumferential sipe 11 extends continuously in the tread circumferential direction, and the outer circumferential sipe 16 has end portions within the land portion 3d. This is because that: the corner portions of the inner circumferential sipe 11 are unlikely to be deformed due to the small sipe depth, and thus are preferably continuous in the tread circumferential direction in order to increase the edge component; on the other hand, the corner portions of the outer circumferential sipe 16 are likely to be deformed due to a comparatively large sipe depth, and thus it is possible to have end portions in order to improve the rigidity of the corner portions and to ensure the edge pressure. In this way, it is possible to improve the on-snow performance during cornering as a whole.

Here, when the pitch spacing in the tread circumferential direction of the side circumferential sipes 12 is L (mm), the distance in the tread widthwise direction between the circumferential main groove 2c and the inner circumferential sipe 11 is W1 (mm), and the distance in the tread widthwise direction between the inner circumferential sipe 11 and the outer circumferential sipe 16 is W2 (mm), this disclosure preferably satisfies the conditions that:

$$0.7 \leq L/W1 \leq 1.4, \text{ and } 0.7 \leq L/W1 \leq 1.4.$$

This is because that by setting the ratios L/W1 and L/W2 close to 1, the torsional rigidity of the land portion partitioned by the sipes are increased, and it is possible to further improve the on-snow performance during cornering.

The tire size of the tire of this disclosure can be specifically, e.g., 105/50R16, 115/50R17, 125/55R20, 125/60R18, 125/65R19, 135/45R21, 135/55R20, 135/60R17, 135/60R18, 135/60R19, 135/65R19, 145/45R21, 145/55R20, 145/60R16, 145/60R17, 145/60R18, 145/60R19, 145/65R19, 155/45R18, 155/45R21, 155/55R18, 155/55R19, 155/55R21, 155/60R17, 155/65R13, 155/65R18, 155/70R17, 155/70R19, 165/45R22, 165/55R16, 165/55R18, 165/55R19, 165/55R20, 165/55R21, 165/60R19, 165/65R19, 165/70R18, 175/45R23, 175/55R18, 175/55R19, 175/55R20, 175/55R22, 175/60R18, 175/65R15, 185/45R22, 185/50R16, 185/50R20, 185/55R19, 185/55R20, 185/60R17, 185/60R19, 185/60R20, 195/50R20, 195/55R20, 195/60R19, 195/65R17, 205/50R21, 205/55R16, 205/55R20, 205/60R16, 205/60R18, 215/50R21, 215/60R17, 225/65R17.

In the pneumatic radial tire for passenger vehicles having a size of a narrow width and a large size of this disclosure, which satisfies the aforementioned relation expression (1), a high elasticity rubber is preferably used as the tread rubber from the viewpoint of improving the wet performance. This is in contrast to the fact that the wet performance tends to be improved as compared to the case of using a low elasticity rubber in a pneumatic radial tire for passenger vehicles of conventional sizes. A pneumatic radial tire for passenger vehicles having a size of a narrow width and a large diameter, which satisfies the aforementioned relation expression (1), has a narrow contact width, and particularly has a high ground contact pressure in use under a high pressure. Therefore, it is regarded that by increasing the circumferential shear rigidity, the grounding property on wet road surface is improved.

Specifically, the high elasticity rubber preferably has a dynamic storage modulus E' at 30° C. of 6.0 to 12.0 MPa. By satisfying this range, it is possible to further improve the wet performance in a pneumatic radial tire for passenger vehicles having a size of a narrow width and a large diameter. Further, the loss tangent tan δ at 60° C. of the tread rubber is preferably 0.05 to 0.15. By satisfying this range, it is possible to further reduce the rolling resistance.

In this disclosure, the tread rubber can have a plurality of different rubber layers formed by stacking in the tire radial direction. The aforementioned plurality of rubber layers can have different loss tangent, modulus, hardness, glass-transition temperature, material, etc. Moreover, it is possible to vary the ratio of tire radial thickness of the plurality of rubber layers in the tire widthwise direction, and it is possible to use a rubber layer different from its surroundings as merely the groove bottoms of the circumferential main groove bottoms, etc.

In this disclosure, the tread rubber can be formed of a plurality of different rubber layers in the tire widthwise direction. The aforementioned plurality of rubber layers can have different loss tangent, modulus, hardness, glass-transition temperature, material, etc. Moreover, the ratio of tire widthwise widths of the plurality of rubber layers can be varied in the tire radial direction, and it is possible to use a rubber layer different from its surroundings in merely a limited partial region, i.e., merely the vicinity of the circumferential main grooves, the vicinity of the tread edge TE, the shoulder land portion and the center land portion.

The tire of this disclosure preferably has an inclined belt layer formed of a rubberized layer of cords extending in a manner inclined with respect to the tire circumferential direction, and in this case, the number of the inclined belt layer can be 1. Note that in the radial tire for passenger vehicle having a size of a narrow width and a large diameter, which satisfies the aforementioned relation expression (1), if there is only one inclined belt layer, the contact patch shape is likely to be distorted during cornering. Therefore, it is preferable to have two or more inclined belt layers between which cords extend in directions crossing each other. In the pneumatic radial tire for passenger vehicles of this disclosure, it is the most preferable to use a belt structure in which the inclined belt layer is formed of two belt layers.

In this disclosure, the tire widthwise width of a maximum width inclined belt layer, which has the largest tire widthwise width, is preferably 90% to 115% of the tread width TW, and particularly preferably 100% to 105% of the tread width TW.

In this disclosure, as belt cords of the inclined belt layer, metallic cords, in particular, steel cords are the most ordinarily used, but organic fiber cords can be used as well. The steel cords can contain steel as a main component, and contain various components at a low amount, such as carbon, manganese, silicon, phosphorus, sulfur, copper, chromium and the like.

In this disclosure, the belt cords of the inclined belt layers for forming the inclined belt 16 can be monofilament cords, or cords formed of a plurality of twisted filaments. Various designs can be used as the twist structure, and various cross section structure, twist pitch, twist direction, distance of adjacent filaments can be used as well. Further, cords formed of twisted filaments of difference materials can be used, and the cross section structure is not specifically limited, and can be various twist structures such as single twist, layer twist, multi twist and the like.

In this disclosure, the inclination angle of the belt cords of the inclined belt layer is preferably 10° or more with respect to the tire circumferential direction.

In this disclosure, the inclination angle of the belt cords of the inclined belt layers is preferably set to a large angle. Specifically, within a range of 35° or more with respect to the tire circumferential direction, and in particular, 55° to 85° with respect to the tire circumferential direction. This is because that by setting the inclination angle to 35° or more, it is possible to increase the rigidity with respect to the tire widthwise direction, and in particular, improve the steering stability when cornering. Moreover, this is because that it is possible to reduce the shearing deformation of the rubber between the layers, and to improve the rolling resistance.

The tire of this disclosure can have a circumferential belt formed of one or more circumferential belt layers on the tire radial outer side of the inclined belt layers.

In the case where inclination angles $\theta 1$, $\theta 2$ of the belt cords of the inclined belt layers are 35° or more, in the circumferential belts, the tire circumferential rigidity per unit width of the central region C inclusive of the tire equatorial plain CL is preferably higher than the tire circumferential rigidity per unit width of the other regions.

Figure 6:
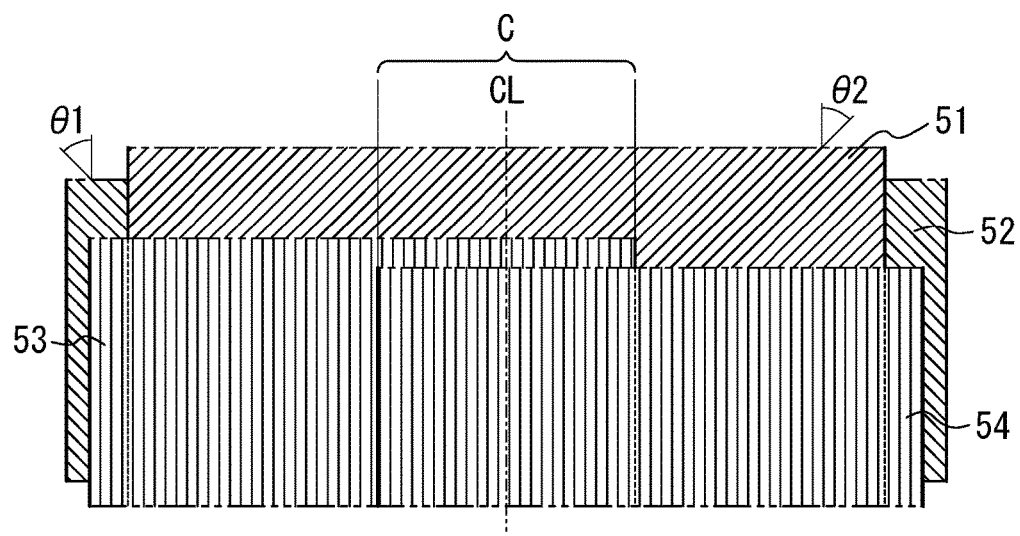
FIG. 6 illustrates a schematic plan view showing an example of the belt structure.

FIG. 6 illustrates a schematic example of the belt structure, in which circumferential belt layers 53, 54 are stacked on the tire radial outer side of inclined belt layers 51, 52, and in a central region C, the circumferential belt layers 53, 54 overlap each other in the tire radial direction.

For example, as illustrated in FIG. 6, by setting the number of the circumferential belt layers within the central region C larger than the other regions, it is possible to set the tire circumferential rigidity per unit width within the central region C higher than the tire circumferential rigidity per unit width within the other regions.

Most tires, in which the belt cords of the inclined belt layers are inclined by 35° or more with respect to the tire circumferential direction, become a shape in which the entire tread surface vibrates in a same degree within a high frequency band of 400 Hz to 2 kHz, in primary, secondary and tertiary vibration modes in the cross-sectional direction, and thus generate a loud noise emission. Then, by locally increasing the tire circumferential rigidity of the tire widthwise central region of the tread, the tire widthwise central region of the tread becomes unlikely to be expanded in the tire circumferential direction, and expansion of the tread surface in the tire circumferential direction is suppressed. As a result, it is possible to reduce the noise emission.

Further, as mentioned above, in a tire having an increased rigidity in the tire circumferential direction of the central region inclusive of the tire equatorial plain CL, the tread preferably has land portions continuous in the tire circumferential direction in a region in the tread surface inclusive of at least the tire equatorial plain CL. By arranging circumferential main grooves on the tire equatorial plain CL or in its vicinity, there is a probability that the rigidity of the tread within the region is reduced and the contact length in the land portions partitioning the circumferential main grooves becomes extremely short. Then, from the viewpoint of improving the noise performances without reducing the cornering power, it is preferable to arrange land portions (rib-like land portions) continuous in the tire circumferential direction within a predetermined region inclusive of the tire equatorial plain CL.

Figure 7:
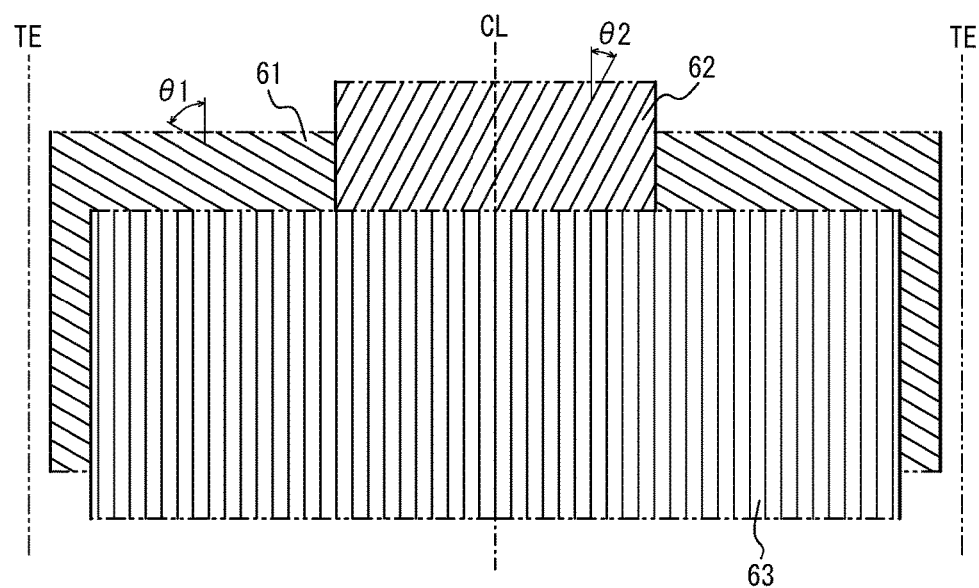
FIG. 7 illustrates a schematic plan view showing another example of the belt structure.

FIG. 7 schematically illustrates another example of the belt structure, in which one circumferential belt layer 63 is laminated on the tire radial outer side of two inclined belt layers 61, 62.

In this disclosure, according to the example as illustrated in FIG. 7, in the case where the inclination angle of the belt cords of inclined belt layers is 35° or more, it is preferable that the inclined belt layers include at least two inclined belt layers having different tire widthwise width, and the inclination angle $\theta 1$ of cords for forming the maximum width inclined belt layer with respect to the tire circumferential direction and the inclination angle $\theta 2$ of the cords for forming the inclined belt layer with respect to the tire circumferential direction satisfy $35° \leq \theta 1 \leq 85°$, $10° \leq \theta 2 \leq 30°$, and $\theta 1 > \theta 2$.

Most tires comprising inclined belt layers, which have belt cords inclined by 35° or more with respect to the tire circumferential direction, become a shape in which the entire tread surface vibrates in a same degree within a high frequency band of 400 Hz to 2 kHz, in primary, secondary and tertiary vibration modes in the cross-sectional direction, and thus generate a loud noise emission. Then, by locally increasing the tire circumferential rigidity of the tire widthwise central region of the tread, the tire widthwise central region of the tread becomes unlikely to be expanded in the tire circumferential direction, and expansion of the tread surface in the tire circumferential direction is suppressed. As a result, it is possible to reduce the noise emission.

Figure 8:
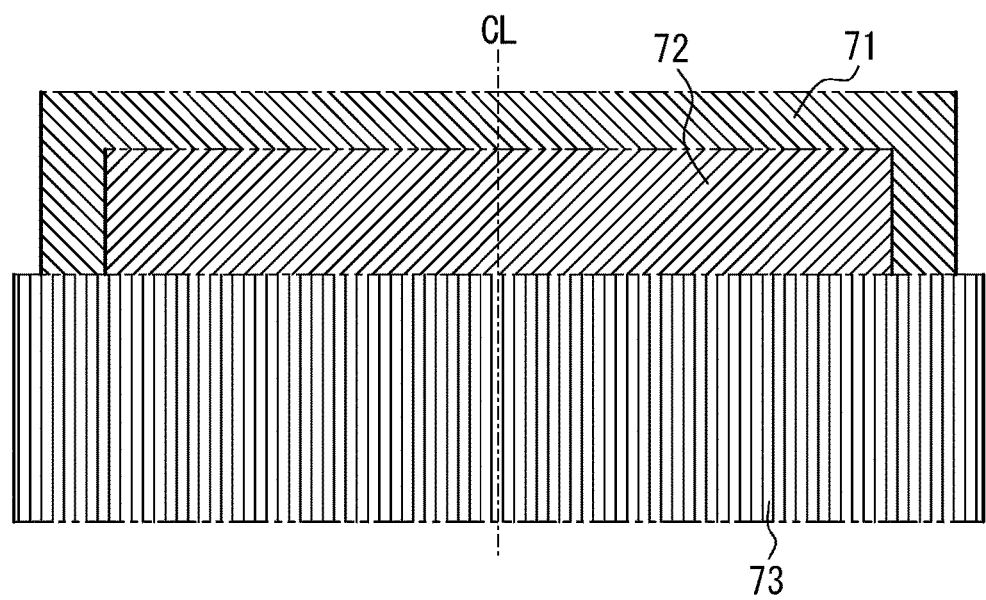
FIG. 8 illustrates a schematic plan view showing further another example of the belt structure.

FIG. 8 schematically illustrates another example of the belt structure, in which one circumferential belt layer 73 is laminated on the tire radial outer side of two inclined belt layers 71, 72.

In a radial tire for passenger vehicle having a narrow width and a large diameter, which satisfies the aforementioned relation expression (1), the circumferential belt layers preferably have a high rigidity, and more specifically, preferably are formed of rubberized layers of cords extending in the tire circumferential direction, and satisfy $1500 \geq X \geq 750$, where $X = Y \times n \times m$, Y (GPa) is the Young's modulus of the cords, n is the implantation number per 50 mm, and m is the number of the circumferential belt layers. In a radial tire for passenger vehicle having a size of a narrow width and a large size, which satisfies the aforementioned relation expression (1) and/or (2), by generating local deformation in the tire circumferential direction with respect to the force from the road surface when cornering, the contact patch is likely to become a triangular shape, i.e., a shape in which the circumferential contact length greatly varies depending on the tire widthwise position. With respect to the above, by using circumferential belt layers having a high rigidity, the ring rigidity of tire is improved, and deformation in the tire circumferential direction is suppressed. Therefore, due to incompressibility of the rubber, tire widthwise deformation is suppressed and the ground contact area becomes unlikely to change. Further, by improving the ring rigidity, eccentric deformation is accelerated, and simultaneously, the rolling resistance is improved. This improvement effect of the rolling resistance is particularly great in a pneumatic radial tire for passenger vehicles having a size of a narrow width and a large diameter, which satisfies the aforementioned relation expression (1).

Further, in the case of using circumferential belt layers having a high rigidity as mentioned above, the inclination angle of the belt cords of the inclined belt layers with respect to the tire circumferential direction is preferably a large angle, specifically, 35° or more. In the case of using circumferential belt layers having a high rigidity, the tire circumferential rigidity is increased, and thereby the contact length of the tire is reduced. Then, by using inclined belt layers having a large angle, it is possible to reduce the tire circumferential out-of-plane bending stiffness, increase the tire circumferential elongation of the rubber during tread deformation, and suppress reduction in contact length.

In the present embodiment, in the circumferential belt layers, it is possible to use wavy-shaped cords in order to improve the rupture strength. Similarly, it is possible to use high elongation cords (e.g., one of which the elongation at rapture is 4.5 to 5.5%) in order to improve the rupture strength.

Further, in this disclosure, it is possible to use various materials in the circumferential belt layers, and as representative examples, rayon, nylon, polyethylene naphthalate (PEN), polyethylene terephthalate (PET), aramid, glass fiber, carbon fiber, steel, etc. can be used. From the viewpoint of reduction in weight, organic fiber cord is particularly preferable.

Here, in this disclosure, as the cords of the circumferential belt layers, it is possible to use monofilament cords, cords obtained by twisting a plurality of filaments, or hybrid cords obtained by twisting filaments of different materials.

In this disclosure, the implantation number of cords in the circumferential belt layers can be within a range of 20 to 60 per 50 mm, but is not limited within this range.

Further, in this disclosure, the rigidity, material, layer number, implantation density, etc. can be distributed in the tire width direction. For example, it is possible to increase the number of the circumferential belt layers merely on the tire widthwise edge portions, or, on the other hand, increase the number of the circumferential belt layers merely in the center portion.

In this disclosure, the circumferential belt layers can be designed to have a wider or narrower width than the inclined belt layers. For example, the tire widthwise width can be set to 90% to 110% of maximum width inclined belt layers having a maximum tire widthwise width among the inclined belt layers.

Here, from the viewpoint of manufacture, circumferential belt layers are preferably formed as spiral layers.

In this disclosure, it is possible to not dispose circumferential belt layers.

In this disclosure, various structures can be used in the carcass line. For example, a carcass maximum width position in the tire radial direction can be set either close to the bead side or close to the tread side. For example, the carcass maximum width position can be disposed within a range of 50% to 90% as compared to the tire cross sectional height on the tire radial outer side from a bead base portion.

In this disclosure, various structures can be used in the carcass as well. For example, the implantation number of carcass can be set within a range of 20 to 60 per 50 mm, but is not limited within such range.

Further, for example, it is possible to locate a folded-up end of the carcass on a tire radial side inner than a tire radial end of a bead filler; or alternatively, the carcass folded-up end can be located on a tire radial outer side end of the bead filler or a tire radial side outer than a tire maximum width position, and occasionally, can extend to a tire widthwise side inner than a tire width end of the inclined belt layer. Further, in the case where the carcass is formed of a plurality of carcass plies, tire radial positions of folded-up ends of the carcasses can be different from each other. Moreover, it is possible to include no carcass folded-up portions, but use a structure sandwiching with a plurality of bead core members, or winding on the bead core.

In a radial tire for passenger vehicle having a size of a narrow width and a large diameter, which satisfies the aforementioned relation expression (1), the tire side portion is preferably thin. "The tire side portion is thin" refers to that, e.g., a tire widthwise cross-sectional area S1 of the bead filler can be set to 1 time or more and 4 times or less to a tire widthwise cross-sectional area S2 of the bead core. Moreover, a ratio Ts/Tb can be set to 15% or more and 40% or less, where Ts is a gauge of the sidewall portion at a tire maximum width position, and Tb is a bead width at tire radial central position of the bead core. Moreover, a ratio Ts/Tc can be set to 5 or more and 10 or less, where Ts is the gauge of the sidewall portion at a tire maximum width portion, and Tc is a diameter of the carcass cords.

Here, the gauge Ts is a total thickness of all the members such as the rubber, the reinforcement member, the inner liner and the like. Moreover, in the case the bead core has a structure divided into a plurality of small bead cores by the carcass, Tb is a distance between a widthwise innermost edge portion and a widthwise outermost edge portion among all the small bead cores.

In this disclosure, the tire maximum width position can be disposed within a range of 50% to 90% as compared to the tire cross sectional height on the tire radial outer side from a bead base portion.

The tire of this disclosure can have a structure having a rim guard.

The tire of this disclosure can have a structure without disposing a bead filler.

In this disclosure, the bead core can have various structures, such as one having a circular cross section, a polygonal cross section, etc. Moreover, it is possible to use a structure winding the carcass on the bead core, or sandwiching the carcass with a plurality of bead core members.

In this disclosure, a rubber layer, cord layer, etc. can be further disposed on the bead portion for the purpose of reinforcement, etc. Such additional member can be disposed at various positions with respect to the carcass or the bead filler.

In this disclosure it is preferable to increase the thickness of the inner liner from the viewpoint of reducing internal vehicle noise of 80 to 100 Hz. Specifically, it is preferable to set the thickness to about 1.5 mm to 2.8 mm thicker than ordinary (about 1.0 mm).

It is known that the pneumatic radial tire for passenger vehicles having a size of a narrow width and a large size of this disclosure, which satisfies the aforementioned relation expression (1), the internal vehicle noise of 80 to 100 Hz is likely to become serious particularly when used at a high internal pressure. By increasing the thickness of the inner liner, it is possible to improve the vibration damping property, and to reduce the internal vehicle noise of 80 to 100 Hz. Further, since the loss contributed by the inner liner to the rolling resistance is smaller as compared to the other members such as the tread and the like, it is possible to limit the deterioration of rolling resistance to the minimum, and simultaneously improve the noise performance.

In this disclosure, the inner liner can be formed of film layers having resin as a main component, other than rubber layers having butyle rubber as a main body.

In this disclosure, in order to reduce cavity resonance noise, it is possible to arrange porous members or perform electrostatic flocking on a tire inner surface.

The tire of this disclosure can include sealant members on the tire inner surface for preventing air leakage at puncture.

The pneumatic radial tire for passenger vehicles of this disclosure can be a side reinforcing run-flat tire having on the tire side portion a reinforcing rubber having a crescent-shaped cross section.

In a pneumatic radial tire for passenger vehicles having a size of a narrow width and a large diameter, in the case of a side reinforcing run-flat tire, by using a structure having a simplified side portion, it is possible to achieve both run-flat durability and fuel efficiency. This is based on the knowledge that in the case of a pneumatic radial run-flat tire for passenger vehicles having a size of a narrow width and a large diameter, which satisfies the aforementioned relation expression (1), during run-flat travel, deformation of the side portion and the tread portion is relatively small, and on the other hand, deformation from the shoulder portion to a buttress portion is relatively large. This deformation is in contrast to a relatively large deformation of the side portion in tires of conventional sizes. Due to such characteristic deformation of a tire having a size of a narrow width and a large diameter, which satisfies the aforementioned relation expression (1), it is possible to sufficiently ensure the run-flat durability and further improve the fuel efficiency even with a simplified structure.

Specific means for simplification can be one satisfying at least one of the following (i) to (iii).

Figure 9:
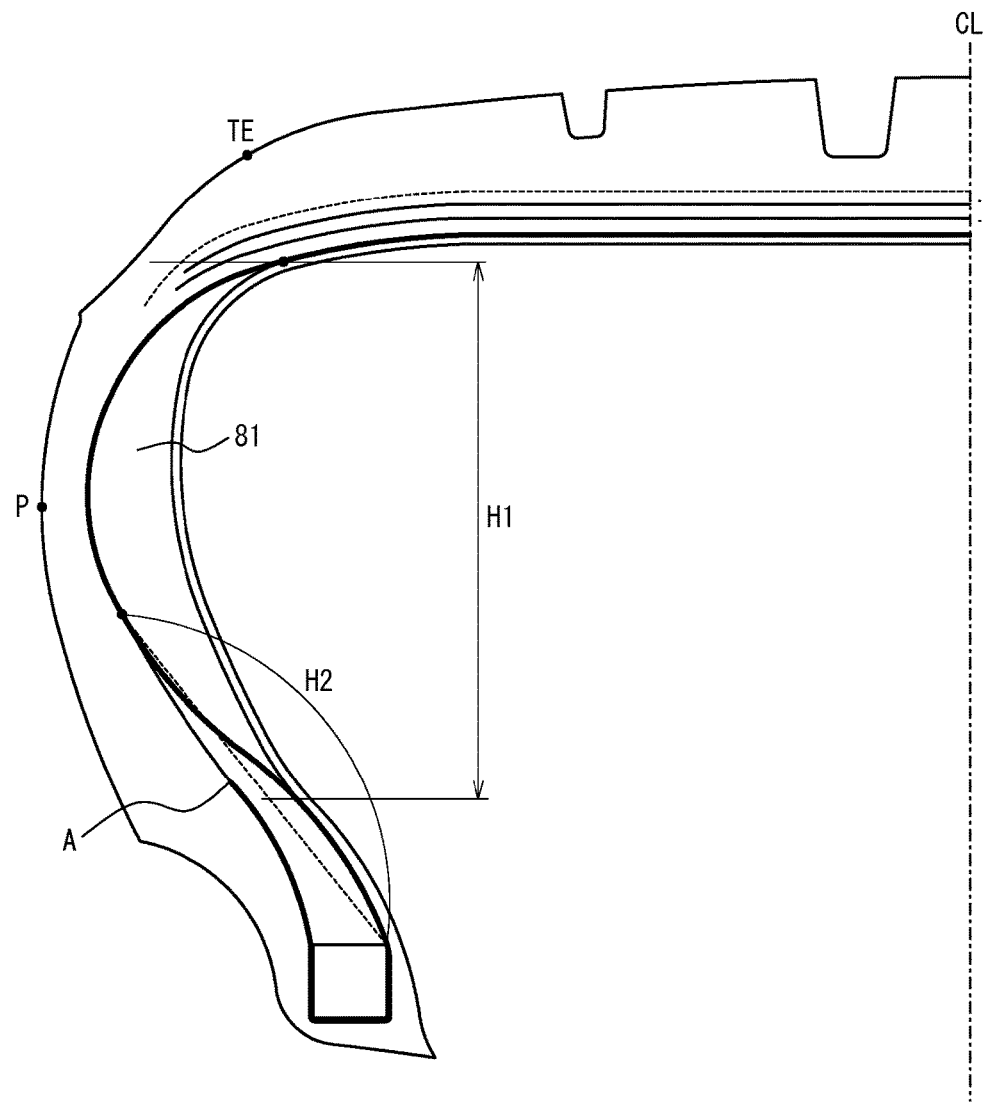
FIG. 9 illustrates a tire widthwise cross-sectional view of a tire according to an embodiment of this disclosure, in the case where the tire of this disclosure is a run-flat tire.

FIG. 9 illustrates a tire widthwise cross-sectional view of a tire according to an embodiment of this disclosure, in the case where the tire of this disclosure is a run-flat tire.

(i) As illustrated in FIG. 9, the folded-up end A of the carcass folded-up portion is located on the tire radial side inner than the tire maximum width position P. (ii) H1 and H2 satisfy $1.8 \leq H1/H2 \leq 3.5$, where H1 is a tire radial maximum length of the side reinforcing rubber 81 in a tire widthwise cross section in a standard state where the tire is mounted to a rim, applied a predetermined internal pressure and applied no load, and H2 is the length of a line segment connecting a tire radial outermost point of the bead filler and a tire radial outermost point of the bead core. (Here, as illustrated in the example of FIG. 9, when there are a plurality of length H2 of the segment connecting the tire radial outermost point of the bead filler and the tire radial outermost point of the bead core, a maximum length among them is used as the length H2.) (iii) The relation ression 10 (mm)$\leq$(SW/OD)$\times$H1$\leq$20 (mm) is satisfied, where H1 is a tire radial maximum length (mm) of the side reinforcing rubber 81 in a tire widthwise cross section in a standard state where the tire is mounted to a rim, applied a predetermined internal pressure and applied no load.

EXAMPLES

In order to certify the effect of this disclosure, the tires of Examples 1 to 3 and Comparative Examples 1, 2 were produced experimentally. Here, Example 1 is a tire having a tread pattern as illustrated in FIG. 1. Moreover, the difference between the tires according to Examples 2 to 3, Comparative Examples 1, 2 and Example 1 is as follows. First, the tire according to Example 2 does not have second one-end opening sipes 7. Further, in the tire according to Example 3, the first one-end opening sipes 6 do not laterally cross the tire equatorial plain CL. Moreover, the tire according to Comparative Example 1 does not have first one-end opening sipes 6 or second one-end opening sipes 7. Further, in the tire according to Comparative Example 2, the first one-end opening sipes 6 extend until the circumferential sipe 4.

Each aforementioned tire of the tire size 175/60R18 was mounted to a rim, and applied with an internal pressure of 320 kPa. The tires were amounted to a vehicle in a manner such that the one-end opening lateral grooves 5 are located on the outer half portion when mounted to the vehicle, and the tire performances were evaluated via the following tests.

<Steering Stability>

Regarding each aforementioned tire, the travelling performance when travelling on dry road surface was evaluated via the senses of the driver. The evaluation was performed with a relative value with the evaluation result of the tire according to Comparative Example 1 as 100, where a larger value indicates a better steering stability.

<Noise Performance>

The noise level was measured on a running test drum by rolling the drum at a speed of 100 km/h, via a mobile microphone. The difference of noise level based on the noise level of Comparative Example 1 was evaluated. A lower value indicates a better noise reduction effect.

<On-Snow Performance>

The inverse number of the time from stopped state until 30 km/h was obtained. Index evaluation was performed with a relative value with Comparative Example 1 as 100, where a larger value indicates a better on-snow performance.

These evaluation results are as shown in the following Table 1 together with the dimensions of the tires.

TABLE 1

|  | Example 1 | Example 2 | Example 3 | Comparative Example 1 | Comparative Example 2 |
|---|---|---|---|---|---|
| Drawing | FIG. 1 | — | — | — | — |
| One-end opening lateral groove 5 | Presence Extending until the circumferential narrow groove | Presence Extending until the circumferential narrow groove | Presence Extending until the circumferential narrow groove | Presence Extending until the circumferential narrow groove | Presence Extending until the circumferential narrow groove |
| First one-end opening sipe 6 | Presence Laterally crossing the tire equatorial plain Not extending until the circumferential narrow groove | Presence Laterally crossing the tire equatorial plain Not extending until the circumferential narrow groove | Presence Not laterally crossing the tire equatorial plain Not extending until the circumferential narrow groove | Absence — — | Presence Laterally crossing the tire equatorial plain Extending until the circumferential narrow groove |
| Second one-end opening sipe 7 | Presence Extending until the circumferential narrow groove | Absence — | Presence Extending until the circumferential narrow groove | Absence — | Presence Extending until the circumferential narrow groove |
| Steering stability | 108 | 104 | 105 | 100 | 105 |
| Noise performance | 108 | 110 | 111 | 100 | 95 |
| On-snow performance | 112 | 108 | 106 | 100 | 115 |

As shown in Table 1, it is understood that as compared to the tires according to Comparative Examples 1, 2, all the tire according to Examples 1 to 3 can maintain the steering stability, the noise performance and the on-snow performance at a high level. Moreover, via the comparison between Example 1 and Example 2, it is understood that Example 1, which has the second one-end opening sipes 7, has on-snow performance better than Example 2. Further, via the comparison between Example 1 and Example 3, it is understood that Example 1, in which the first one-end opening sipes 6 laterally cross the tire equatorial plain CL, has on-snow performance better than Example 3.

REFERENCE SIGNS LIST 1 tread surface
2, 2a, 2b, 2c circumferential main groove
3a, 3b, 3c, 3d land portion
4 circumferential sipe
5 one-end opening lateral groove
6 first one-end opening sipe
7 second one-end opening sipe
8 side lateral groove
9 first side sipe
10 intermediate sipe
11 inner circumferential sipe
12 second side sipe
13 side circumferential sipe
14 bottom up portion
15 bottom up portion
16 outer circumferential sipe
51, 52 inclined belt layer
53, 54 circumferential belt layer
61, 62 inclined belt layer
63 circumferential belt layer
71, 72 inclined belt layer
73 circumferential belt layer
81 side reinforcing rubber
TE tread edge

The invention claimed is:

1. A pneumatic tire, comprising on a tread surface a plurality of circumferential main grooves extending in a tread circumferential direction, and a rib-like land portion partitioned by two of the plurality of circumferential main grooves extending in the tread circumferential direction, wherein:

the rib-like land portion has one or more circumferential sipes extending in the tread circumferential direction;

the rib-like land portion has one or more one-end opening lateral grooves and one or more first one-end opening sipes, the one-end opening lateral grooves extending from a first one of the two circumferential main grooves in a tread widthwise direction until a position connecting to the one or more circumferential sipes, and ending within the rib-like land portion; the first one-end opening sipes extending from a second one of the two circumferential main grooves in a tread widthwise direction, and ending within the rib-like land portion without connecting to the one or more circumferential sipes;

when an internal pressure is set to 250 kPa or more, in the case where a sectional width SW of the tire is less than 165 mm, a ratio SW/OD of a sectional width SW to an outer diameter OD of the tire is 0.26 or less, and in the case where the sectional width SW of the tire is greater than or equal to 165 mm, the sectional width SW and the outer diameter OD of the tire satisfy a relation expression OD≥2.135×SW+282.3;

a tire widthwise cross-sectional area S1 of a bead filler and a tire widthwise cross-sectional area S2 of a bead core satisfy a relation expression S2≤S1≤4×S2;

a ratio Ts/Tb satisfies the relation expression 15%≤Ts/Tb≤40%, where Ts is a gauge of a sidewall portion at a tire maximum width position, and Tb is a bead width at a tire radial central position of the bead core;

a ratio Ts/Tc satisfies the relation expression 5≤Ts/Tc≤10, where Ts is the gauge of the sidewall portion at the tire maximum width position, and Tc is a diameter of carcass cords;

between two of the one-end opening lateral grooves adjacent to each other in the tread circumferential direction, one or more second one-end opening sipes extend from the first one of the two circumferential main grooves in the tread widthwise direction until a position connecting to the circumferential sipes, and ending within the rib-like land portion;

a plurality of the one-end opening lateral grooves are formed on the rib-like land portion in a manner spaced from each other in the tread circumferential direction; and a pitch spacing in the tread circumferential direction of two of the one-end opening lateral grooves adjacent to each other in the tread circumferential direction is set to 35 to 70 mm, a pitch spacing in the tread circumferential direction of the first one-end opening sipes is set to 10 to 15 mm, and a pitch spacing in the tread circumferential direction of the second one-end opening sipes is set to 10 to 15 mm.

2. The pneumatic tire according to claim 1, wherein: the first one-end opening sipes laterally cross a tire equatorial plane.

3. The pneumatic tire according to claim 1, wherein the tire has an aspect ratio set to be 45 to 70.

4. The pneumatic tire according to claim 1, wherein the tire has a maximum width set to be 105 mm to 225 mm.

5. The pneumatic tire according to claim 1, wherein the tire has a rim diameter set to be 13 in. to 23 in.

6. The pneumatic tire according to claim 1, wherein the tire has an overall diameter set to be 511.1 mm to 751.3 mm.

7. The pneumatic tire according to claim 1, comprising a high elasticity rubber having a dynamic storage modulus E' at 30° C. of 6.0 MPa to 12.0 MPa and a loss tangent tan δ at 60° C. of the tread rubber is 0.05 to 0.15.

8. The pneumatic tire according to claim 1, wherein an inclination angle of the one-end opening lateral grooves is set to 30° or less; an inclination angle of the first one-end opening sipes is set to 35° or less; and an inclination angle of the second one-end opening sipes is set to 40° or less.

9. The pneumatic tire according to claim 1, further comprising:
a second rib-like land portion partitioned from the rib-like land portion by the first one of the two circumferential main grooves extending in the tread circumferential direction, the second rib-like land portion having a plurality of side lateral grooves and a plurality of first side sipes, wherein:
an inclination angle against the tread widthwise direction of the side lateral grooves is less than 10°; and
an inclination angle of the first side sipes is 40° or less.

10. The pneumatic tire according to claim 1, wherein a ratio OD/SW is greater than or equal to 3.6.

11. The pneumatic tire according to claim 1, wherein the tire has an air volume greater than or equal to 15,000 cm³.

12. The pneumatic tire according to claim 1, further comprising:
a second rib-like land portion partitioned from the rib-like land portion by a third one of the plurality of circumferential main grooves extending in the tread circumferential direction, the second rib-like land portion having an inner circumferential sipe extending in the tread circumferential direction and an outer circumferential sipe extending in the tread circumferential direction, the outer circumferential sipe being outward from the inner circumferential sipe relative to the third one of the plurality of circumferential main grooves, wherein:
the third one of the plurality of circumferential main grooves has a groove depth h1,
the inner circumferential sipe has a sipe depth h2,
the outer circumferential sipe has a sipe depth h3, and
h1>h3>h2.

13. The pneumatic tire according to claim 1, further comprising:
a second rib-like land portion partitioned from the rib-like land portion by a third one of the plurality of circumferential main grooves extending in the tread circumferential direction, the second rib-like land portion having a plurality of second side sipes, an inner circumferential sipe extending in the tread circumferential direction, and an outer circumferential sipe extending in the tread circumferential direction, the outer circumferential sipe being outward from the inner circumferential sipe relative to the third one of the plurality of circumferential main grooves, wherein:
when the pitch spacing in the tread circumferential direction of the second side sipes is L (mm), the distance in the tread widthwise direction between the third one of the plurality of circumferential main grooves and the inner circumferential sipe is W1 (mm) and the distance in the tread widthwise direction between the inner circumferential sipe and the outer circumferential sipe is W2 (mm), and 0.7≤L/W1≤1.4 and 0.7≤L/W2≤1.4.

14. The pneumatic tire according to claim 1, further comprising at least two inclined belt layers including belt cords, the at least two inclined belt layers having different tire widthwise width, wherein:
the belt cords for forming a maximum width inclined belt layer of the at least two inclined belt layer are inclined at a first inclination angle θ1 with respect to the tire circumferential direction,
the belt cords for forming another one of the at least two inclined belt layers are inclined at a second inclination angle θ2 with respect to the tire circumferential direction, and
in the case where first and second inclination angles θ1, θ2 of the belt cords of the inclined belt layers are 35° or more, in the circumferential belts, a tire circumferential rigidity per unit width of a central region C inclusive of a tire equatorial plane CL is greater than a tire circumferential rigidity per unit of other regions.

15. The pneumatic tire according to claim 14, wherein 35°≤θ1≤85°, 10°≤θ2≤30°, and θ1>θ2.

16. The pneumatic tire according to claim 1, wherein the tire maximum width position is disposed within a range of 50% to 90% as compared to a tire cross sectional height on a tire radial outer side from a bead base portion.

17. A tire-rim assembly including the pneumatic tire according to claim 1, wherein the tire has an internal pressure of 250 kPa to 350 kPa.

* * * * *